United States Patent
White et al.

(10) Patent No.: US 6,483,377 B2
(45) Date of Patent: Nov. 19, 2002

(54) LOW SLEW RATE CHARGE PUMP

(75) Inventors: Bertram J. White, Irvine, CA (US); Ying Zhang McCleary, Irvine, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/758,961

(22) Filed: Jan. 10, 2001

(65) Prior Publication Data

US 2002/0089368 A1 Jul. 11, 2002

(51) Int. Cl.[7] ................................................ G05F 1/10
(52) U.S. Cl. ....................................................... 327/536
(58) Field of Search ................................. 327/530, 534, 327/535, 536, 537; 363/60

(56) References Cited

U.S. PATENT DOCUMENTS

| | | | |
|---|---|---|---|
| 5,262,934 A | | 11/1993 | Price ............................ 363/60 |
| 5,493,486 A | | 2/1996 | Connell et al. ................ 363/60 |
| 5,790,393 A | * | 8/1998 | Fotouhi ......................... 363/60 |
| 5,801,577 A | * | 9/1998 | Tailliet ......................... 327/536 |
| 5,877,948 A | * | 3/1999 | Dijkmans ...................... 363/60 |
| 6,229,385 B1 | * | 5/2001 | Bell et al. .................... 327/656 |
| 6,236,581 B1 | * | 5/2001 | Foss et al. ..................... 363/60 |
| 6,242,970 B1 | * | 6/2001 | Grant et al. ................. 327/536 |

* cited by examiner

*Primary Examiner*—Jeffrey Zweizig
(74) *Attorney, Agent, or Firm*—W. Daniel Swayze, Jr.; W. James Brady; Frederick J. Telecky, Jr.

(57) ABSTRACT

The present invention includes a charge pump circuit to raise a voltage including a voltage source to generate the voltage to be raised, a pair of switches to switch the voltage to a capacitor with the first pair of switches operating during different periods of time and a second pair of switches to switch additional voltage to the capacitor with the second pair of switches operating during different periods of time.

4 Claims, 2 Drawing Sheets

LOW SLEW RATE CHARGE PUMP

FIELD OF THE INVENTION

The present invention relates to improvement in charge pump circuits for producing a voltage output that can double or triple the supply voltage.

BACKGROUND OF THE INVENTION

Capacitor based voltage doubling and voltage inverting circuits are widely known and used in electronics systems where power consumption is relatively low and a variety of different voltage levels are required for operation. Typically, a single unipolar voltage supply of, for example, five volts can be used to generate a range of different voltages between minus five and plus ten volts. This is the most desirable when these voltage doubling/inverting circuits, known as charge pumping circuits, can be locally sited on specific boards near specific IC's which rely on them.

Typically, a charge pump circuit first applies a charging voltage across a capacitor and then connects the capacitor between the power supply and the node to be pumped. This procedure is repeated at a high enough rate and with a large enough capacitor to generate a pumped voltage that can supply a desired load current.

In order for the pumped voltage to supply large current without suffering undesired voltage droop, it is necessary to switch at a high rate and to use low resistance switches. This typically causes the nodes connected to the pump capacitor to have high slew rates. The high slew rates radiate RF energy and causes undesired noise spikes in neighboring circuits.

SUMMARY OF THE INVENTION

The present invention describes a charge pump or voltage doubler that generates low RF switching noise. The present invention utilizes a current source gate drive technique to generate the control signals in such a way as to limit the slew rate of the capacitor nodes without reducing the on resistance of their FET drivers.

DETAILED DESCRIPTION OF THE INVENTION

Figure 1:
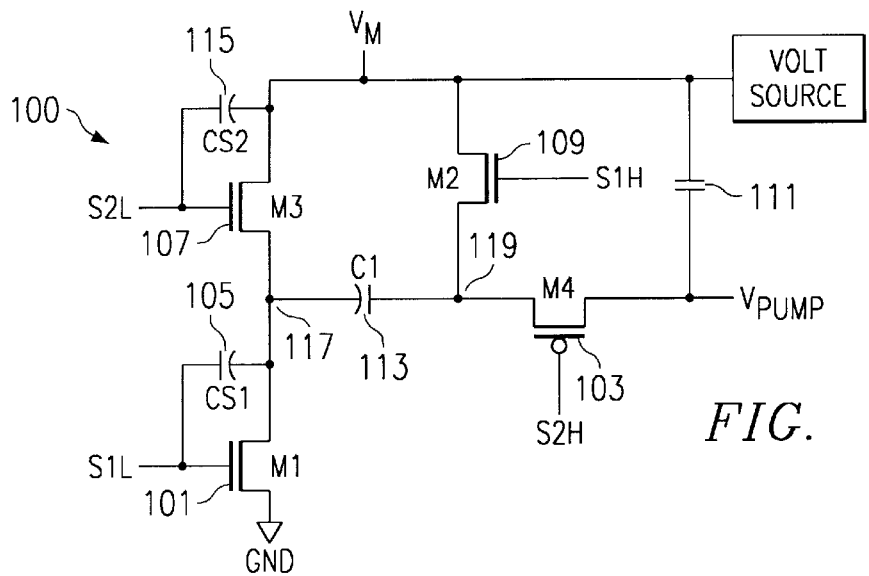
FIG. 1 illustrates a voltage doubler circuit of the present invention.

FIG. 1 illustrates a voltage doubler circuit 100 for use in any system that would employ such devices. One application for circuit 100 is in connection with hard disk drives for use voice coil motors or in the motor that turns the disk drive. The circuit 100 includes two pairs of MOSFETS which are used as switches, a first pair of MOSFETS or switches is NFET 101 and NFET 109. A second pair of MOSFETS or switches is NFET 107 and PFET 103. Each pair of MOSFETS is operated in sequence by non-overlapping clock signals or control signals. The NFET 101 is turned on slowly while NFET 109 is turned on rapidly. Likewise, NFET 107 is turned on slowly, and PFET 103 is turned on rapidly.

In FIG. 1, NFET 107 has a drain connected to the supply voltage $V_M$. Additionally, capacitor 115 is connected between the drain and gate of NFET 107. This capacitor 115 can either be an extra component added to the circuit or can be the parasitic capacitance naturally existing between the gate and drain of NFET 107. The capacitor 115 and the current source nature of the circuit driving the gate of NFET 107, prevent the source of NFET 107 from slewing quickly. The source of NFET 107 is connected to the drain of NFET 101 at terminal 117. Terminal 117 is connected to the drain of NFET 101 and to capacitor 105. The capacitor 105 is connected between the drain and gate of NFET 101. This capacitor 105 can either be an extra component added to the circuit or can be the parasitic capacitance naturally existing between the gate and drain of NFET 101. The function of capacitor 105 is to slow the slewing of the drain of NFET 101 in a similar fashion as the relationship between capacitor 115 and the source of NFET 107. Additionally, NFET 109 is connected between the voltage $V_M$ and the terminal 119. The terminal 119 is another output terminal to output the voltage generated by the circuit 110. The capacitor 113 is connected between terminal 117 and terminal 119. This capacitor 113 is used to double the voltage of the supply $V_M$. The capacitor 111 is connected between the voltage $V_M$ and the source of PFET 103. Capacitor 111 aids in the doubling of capacitor 113. The drain of PFET 103 is connected to the source of NFET 109.

Capacitor 113 is not located on the IC. The wires connecting capacitor 113 to terminals 117 and 119 act as antennae and radiate when driven at high slew rates. RF switching noise is minimized by limiting the slew rate of terminal 117 as described in the previous paragraph. Slew rate control on NFET 109 and PFET 103 is not necessary since, in operation, they are both off while terminal 117, and because of capacitive coupling, terminal 119, is slewing and are turned on afterwards.

Consider the sequence of operation beginning when terminal 117 is connected to VM through NFET 107 and terminal 119 is connected to VPUMP through PFET 103. We now wish to connect terminal 117 to ground and terminal 119 to VM. First, NFET 107 and PFET 103 are turned off. Next, current controlled voltage S1L softly turns on NFET 101. This will cause Terminal 117 to slew toward ground. When terminal 117 nears ground, NFET 109 is turned on. We now have Terminal 117 at ground, and terminal 119 at voltage $V_M$.

During the second phase of operation, we want terminal 117 to return to VM and terminal 119 to return to VPUMP. First, NFET 101 and NFET 109 are turned off. Current controlled voltage S2L softly turns on NFET 107. This will cause terminal 117 to slew toward VM. When terminal 117 nears VM, PFET 103 is turned on. This completes a full cycle of operation, leaving terminal 117 at VM and terminal 119 at Vpump as they were when the cycle began.

Figure 2:
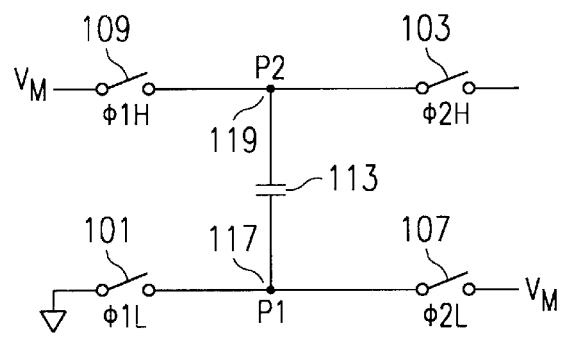
FIG. 2 illustrates a schematic of the present invention.

FIG. 2 illustrates a schematic of capacitor 113 and its connection to NFETs 101, 109, 103 and 107 albeit shown as switches. As NFET 101 is closed, the capacitor 113 is connected to ground. As NFET 107 is closed, the capacitor is connected to voltage $V_M$. As NFET 109 is closed, the capacitor 113 is charged to $V_M$, and as the PFET 103 is closed, the capacitor 113 is charged to voltage $V_{PUMP}$ NFET 107 and NFET 109 operate at different time periods.

Figure 3:
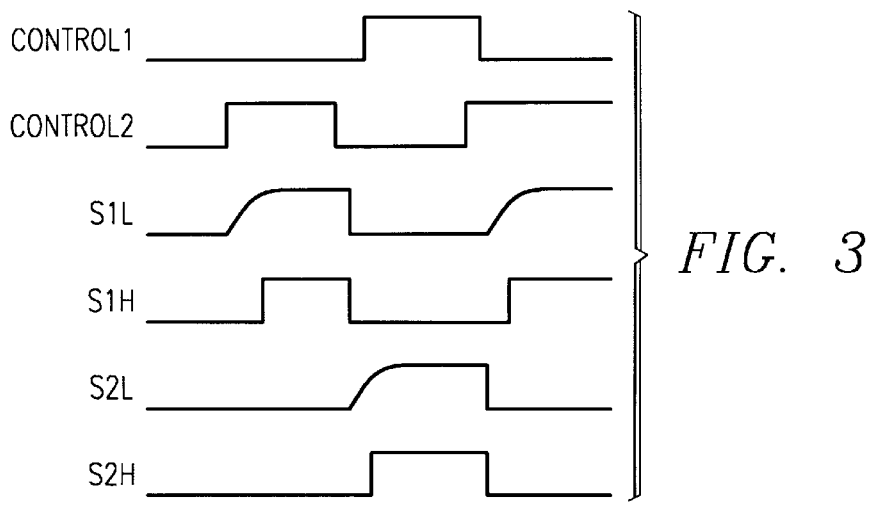
FIG. 3 illustrates control signals of the present invention.

FIG. 3 illustrates the phase and control signal inputs to the gates of NFET 101, NFET 107, NFET 109 and PFET 103.

Signals SIL is input to the gate of NFET 101 to control the operation of NFET 101. The signal S2L is input to the gate of NFET 107 to control the operation of NFET 107. The signal SIH is input to the gate of NFET 109 to control the operation of NFET 109. As illustrated in FIG. 3, the signal SIL is slowly increased as with the signal SL2. The signal SIH and signal S2H are relatively sharp and intended to turn on the respective NFETs and PFETs relatively quickly. The signals SL1 and SL2 are intended to turn on the respective NFETs relatively slowly. The control1 signal controls the circuit illustrated in FIG. 5 to produce SL1, and the control signal 2 controls the circuit illustrated in FIG. 4 to generate the signal SL2. A circuit to generate the signal SL2 is illustrated in FIG. 4 while a circuit to generate the signal SL1 is illustrated in FIG. 5.

Figure 4:
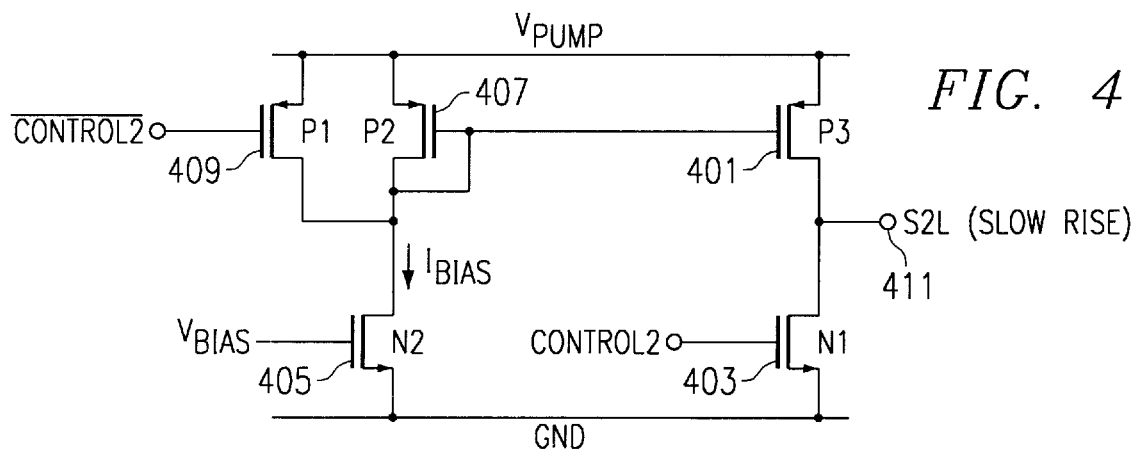
FIG. 4 illustrates one control circuit of the present invention.

In FIG. 4, the source of PFET 409 is connected to voltage $V_{PUMP}$, and the source of PFET 407 is connected to voltage $V_{PUMP}$. The drains of PFET 409 and the drain of PFET 07 are connected together. The drain and gate of PFET 407 are connected together, and the gate of PFET 407 is connected to the gate of PFET 401. The source of PFET 401 is connected to voltage $V_{PUMP}$, and the drain of PFET 401 is connected to the output terminal 411 where the signal S2L is output. PFET 407 and PFET 401 form a current mirror to mirror current. The drain of NFET 405 is connected to the source of PFET 409 and the source of PFET 407. The gate of NFET 405 is connected to voltage $V_{BIAS}$ to control the current $I_{BIAS}$. The drain of NFET 405 is connected to ground. NFET 405 generates a bias current as a result of the voltage $V_{BIAS}$ applied to the gate of NFET 405. The current $I_{BIAS}$ flows from the source to the drain of NFET 405. When the PFET 409 is turned on, no current can flow in the current mirror because the drain of PFET 409 and PFET 407 are connected to voltage $V_{PUMP}$. Thus, no current is mirrored through PFET 401. The drain of PFET 401 is connected to the drain of NFET 403. The source of NFET 403 is connected to ground.

Figure 5:
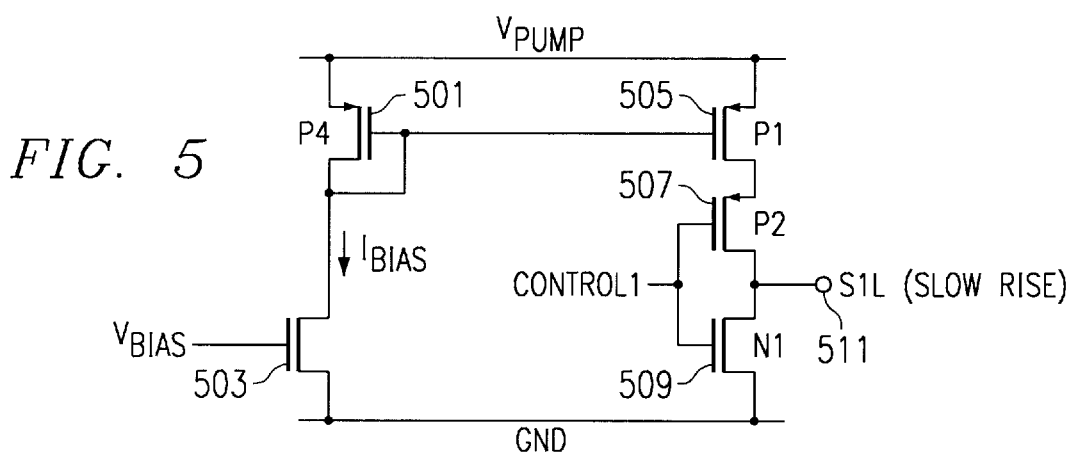
FIG. 5 illustrates another control circuit of the present invention.

FIG. 5 illustrates a circuit to generate the signal S1L. The circuit of FIG. 5 includes a current mirror which includes PFET 501 and PFET 505. The voltage $V_{PUMP}$ is connected to the source of PFET 501, and the drain of PFET 501 is connected to the gate of PFET 501. Additionally, the gate of PFET 501 is connected to the gate of PFET 505. The drain of PFET 501 is connected to the drain of NFET 503. The source of NFET 503 is connected to ground. The gate of NFET 503 is connected to voltage $V_{BIAS}$ to provide a bias which controls current $I_{BIAS}$ flow through the PFET 507. The source of PFET 507 is connected to the drain of PFET 505, and the source of PFET and the drain of PFET 507 are connected to the drain of NFET 509. The gates of PFET 507 and the gate of NFET 509 are connected to receive the control1 signal. When PFET 507 is turned on, NFET 509 is turned off, and current from the current mirror flows to terminal 511 and correspondingly to charge up capacitor 105. When NFET 509 is turned on, terminal 511 is quickly pulled to ground. Thus, the signal S2L referring to FIG. 4 is a voltage which is used to charge the capacitor 115, and the signal S1L is a voltage used to charge capacitor 105.

What is claimed is:

1. A charge pump circuit to raise a voltage comprising:

a voltage source to generate said voltage to be raised;

a first pair of switches to switch said voltage to a capacitor, said first pair of switches operating during different periods of time; and a second pair of switches to switch additional voltage to said capacitor, said second pair of switches operating during different periods of time, wherein said first pair of switches includes a first NFET, wherein said first NFET has a discrete capacitor connected between the gate and the drain.

2. A charge pump circuit as in claim 1, wherein one of said second pair of switches is a second NFET.

3. A charge pump circuit as in claim 2, wherein said second NFET has a discrete capacitor connected between the gate and the drain of said second NFET.

4. A charge pump circuit as in claim 1, wherein said charge pump circuit doubles the voltage.

* * * * *